US010195940B2

(12) United States Patent
Pudar et al.

(10) Patent No.: US 10,195,940 B2
(45) Date of Patent: Feb. 5, 2019

(54) VEHICLE TASK RECOMMENDATION SYSTEM

(71) Applicants: General Motors LLC, Detroit, MI (US); GM Global Technology Operations LLC, Detroit, MI (US)

(72) Inventors: Nikola J. Pudar, Farmington Hills, MI (US); Mohan Jayaraman, Sterling Heights, MI (US); Aqueel Husain, Troy, MI (US); Rejani D. Syamala, Troy, MI (US); Rajesh S. Paul, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 14/884,194

(22) Filed: Oct. 15, 2015

(65) Prior Publication Data
US 2017/0106749 A1    Apr. 20, 2017

(51) Int. Cl.
*B60K 35/00*    (2006.01)
*B60K 37/06*    (2006.01)
*G06F 17/30*    (2006.01)

(52) U.S. Cl.
CPC .............. *B60K 35/00* (2013.01); *B60K 37/06* (2013.01); *G06F 17/30554* (2013.01);
(Continued)

(58) Field of Classification Search
CPC ............ B60K 35/00; B60K 2350/1004; B60K 37/06; B60K 2350/347; G06F 17/3033; G06F 17/30554; G06F 17/30598
See application file for complete search history.

(56) References Cited

U.S. PATENT DOCUMENTS 9,308,920 B2 *   4/2016  Konigsberg .......... B60W 50/08
2011/0145312 A1 *   6/2011  Gokulakannan ...... G06F 9/5033
709/201

(Continued)

FOREIGN PATENT DOCUMENTS

CN        102706354 A      10/2012
CN        103185598 A       7/2013
(Continued)

OTHER PUBLICATIONS

David Ludlow, How to use IFTTT recipes, Dec. 31, 2014.*
(Continued)

*Primary Examiner* — Abby Y Lin
(74) *Attorney, Agent, or Firm* — David Willoughby; Reising Ethington P.C.

(57) ABSTRACT

A method of providing one or more selectable vehicle tasks to one or more vehicles, comprising the steps of: receiving from each of a plurality of vehicle users at least one user-defined task to be carried out by the user's vehicle, wherein the user-defined task comprises at least one vehicle action and a conditional statement, wherein the conditional statement comprises of one or more vehicle conditions; grouping the received user-defined tasks into equivalency classes, wherein different user-defined tasks that have logically equivalent conditional statements and equivalent vehicle actions are grouped into the same equivalency class; analyzing the equivalency classes; selecting at least one vehicle task based on the analysis in step (c); and sending the selected vehicle task(s) to one or more vehicles for presentation to a user at the vehicle(s).

9 Claims, 4 Drawing Sheets

(52) U.S. Cl.
CPC ............... *G06F 17/30598* (2013.01); *B60K 2350/1004* (2013.01); *B60K 2350/357* (2013.01)

(56) References Cited

U.S. PATENT DOCUMENTS

| | | |
|---|---|---|
| 2013/0173084 A1 | 7/2013 | Tagawa et al. |
| 2015/0019967 A1* | 1/2015 | Gutentag .............. G06F 3/0488 715/719 |
| 2015/0134511 A1* | 5/2015 | Ghosh .................. G06Q 20/227 705/39 |
| 2016/0200323 A1* | 7/2016 | Kelly .................... B60W 50/12 701/51 |

FOREIGN PATENT DOCUMENTS

| | | |
|---|---|---|
| CN | 204576805 U | 8/2015 |
| CN | 103646541 B | 5/2017 |

OTHER PUBLICATIONS

Ry Crist, How to control your smart home using your care, Jun. 20, 2014.*
Nick Parlante, Java If and Boolean Logic, Coding Bat, Sep. 23, 2015.*
Adam Dachis, Automatic Links Up with IFTTT to Make Your Car Text, Tweet, and More, Feb. 27, 2015.*
Stoklosa, Alexander, "OBD-No-Way: Automatic is the Do-It-All Connected Diagnostic Device of The Future", Car and Driver, Feb. 28, 2014; accessed Oct. 15, 2015 at http://blog.caranddrivercom/obd-no-way-automatic-is-the-do-it-all-connected-diagnostic-device-of-the-future/, 3 pages.
Chinese Office Action corresponding to application No. 201610880359.1, dated Aug. 31, 2018, 6 pages.

* cited by examiner

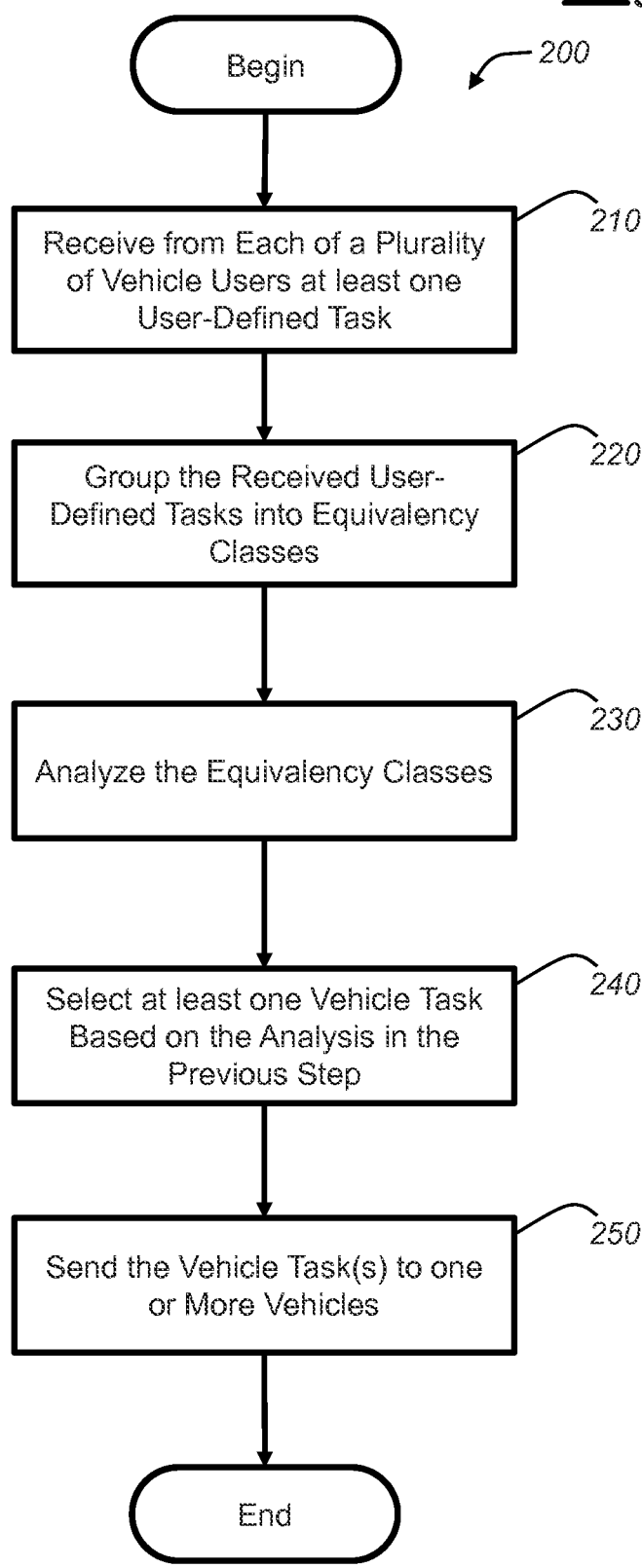

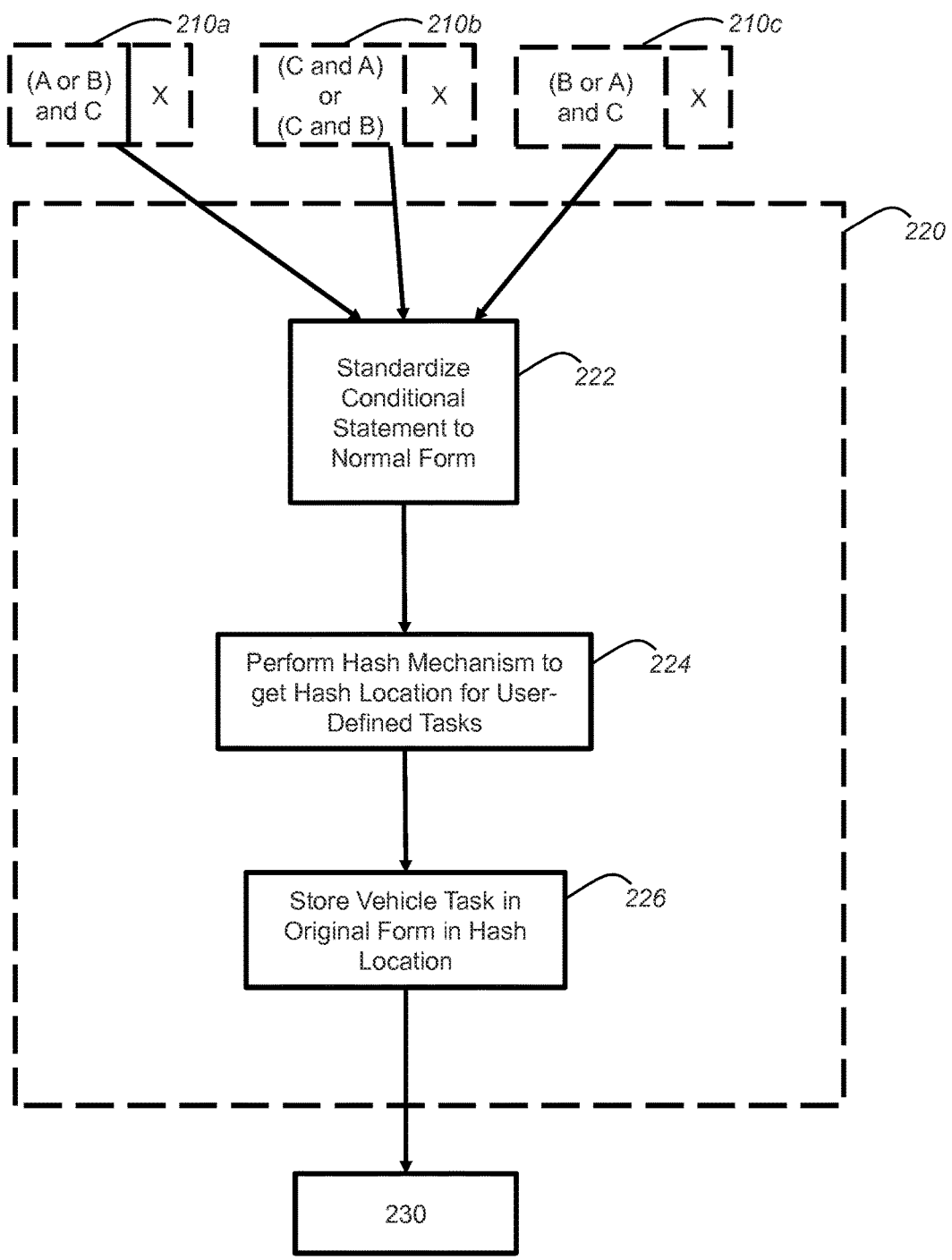

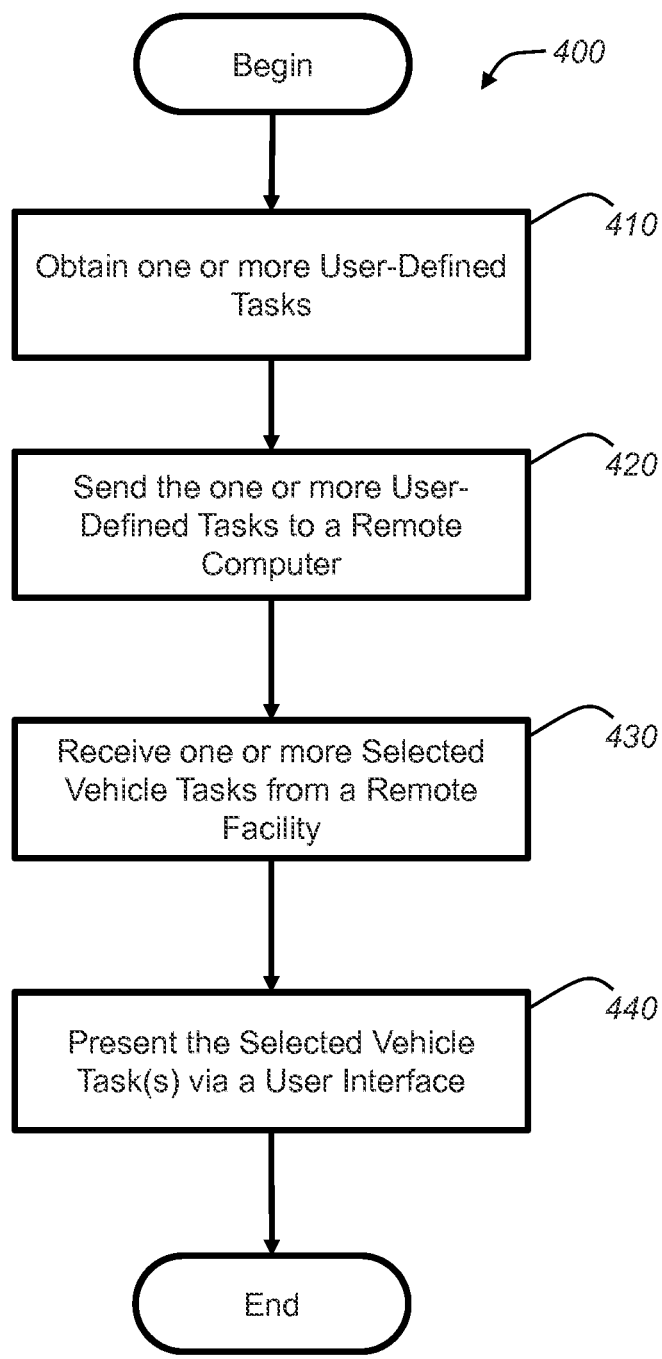

VEHICLE TASK RECOMMENDATION SYSTEM

TECHNICAL FIELD

The present invention relates to vehicle task management generally and, more particularly, to selecting and providing vehicle tasks to be suggested to a vehicle user.

BACKGROUND

Nowadays, vehicles have the ability to monitor many of their systems and components (e.g. the engine, the battery, the electronic systems, etc.) in addition to the vehicle's surroundings and environmental conditions. Vehicles have numerous onboard computers that can operate to analyze the monitored systems, thereby allowing the vehicle to perform various operations in response to the analysis of data from the monitored systems, monitored components and sensors. For example, a vehicle may automatically turn on its headlights upon a reading by a light sensor that there are low light levels (e.g. it is nighttime, the vehicle is in a tunnel, etc.). Furthermore, a vehicle may provide a "fuel almost empty" light indicating that the vehicle has sensed that the fuel level is low. Although preprogrammed vehicle tasks have been implemented for a long time, vehicles have yet to allow the user to configure their vehicle to perform user-defined tasks (i.e. customized vehicle tasks). Additionally, there has been no way to provide the user with suggested vehicle tasks.

SUMMARY

According to an embodiment of the invention, there is provided a method of providing one or more selectable vehicle tasks to one or more vehicles, comprising the steps of: receiving from each of a plurality of vehicle users at least one user-defined task to be carried out by the user's vehicle, wherein the user-defined task comprises at least one vehicle action and a conditional statement, wherein the conditional statement comprises of one or more vehicle conditions; grouping the received user-defined tasks into equivalency classes, wherein different user-defined tasks that have logically equivalent conditional statements and equivalent vehicle actions are grouped into the same equivalency class; analyzing the equivalency classes; selecting at least one vehicle task based on the analysis in step (c); and sending the selected vehicle task(s) to one or more vehicles for presentation to a user at the vehicle(s).

A method of presenting one or more vehicle tasks to a user at a vehicle, comprising the steps of: obtaining one or more user-defined tasks for the vehicle; sending the one or more user-defined tasks to a remote computer; receiving one or more selected vehicle tasks from a remote facility, wherein the one or more selected vehicle tasks are selected based at least in part on one or more user-defined tasks that are received at the remote computer from different vehicles; and presenting the selected vehicle task(s) to an occupant in the vehicle via a user interface at the vehicle.

BRIEF DESCRIPTION OF THE DRAWINGS

One or more embodiments of the invention will hereinafter be described in conjunction with the appended drawings, wherein like designations denote like elements, and wherein:

FIG. 2 is a flowchart illustrating a method of providing one or more selectable vehicle tasks to one or more vehicles;

FIG. 3 is a flowchart illustrating an embodiment of grouping a user-defined task into an equivalency class; and FIG. 4 is a flowchart illustrating a method of presenting one or more vehicle tasks to a user at a vehicle.

DETAILED DESCRIPTION OF THE ILLUSTRATED EMBODIMENT(S)

Figure 1:
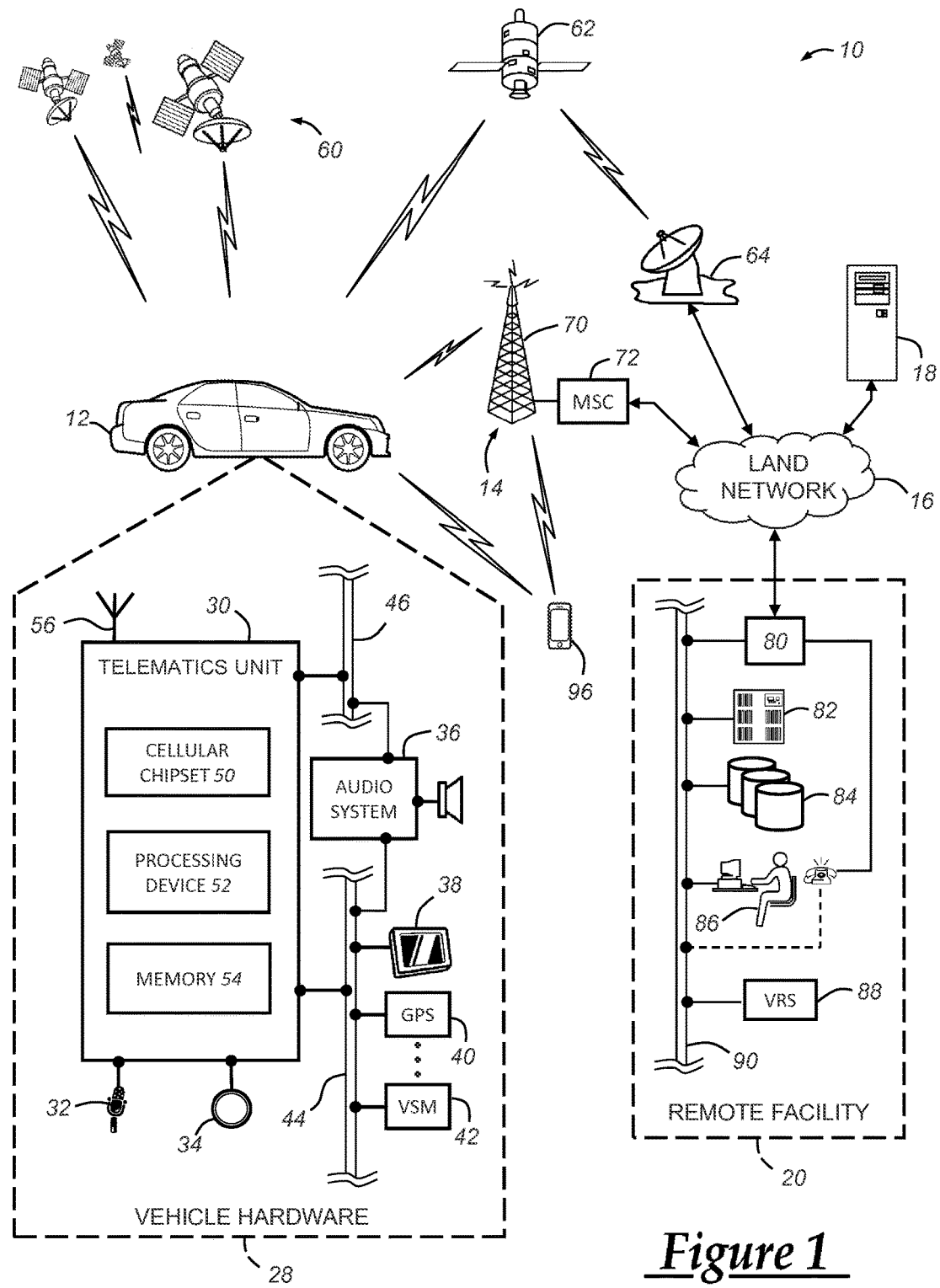
FIG. 1 is a block diagram depicting an embodiment of a communications system that is capable of utilizing the methods disclosed herein.

The system and methods described below enable a vehicle to receive and present suggested vehicle tasks. In one embodiment, a user of a vehicle may configure their vehicle to carry out one or more vehicle tasks via a user interface such as a touch-screen infotainment module. Next, the vehicle may send the user-defined vehicle task(s) to a remote facility via the communications system described below. The remote facility may be a call center, a data center, or a single computer with network capabilities. At the remote facility, the user-defined tasks can be grouped into equivalency classes. The equivalency classes may be analyzed and at least one vehicle task may be selected to be sent to one or more vehicles. The vehicles may then present the received vehicle task(s) to a vehicle occupant via a user interface, such as an infotainment unit.

Communications System—

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, mobile device 96, and a remote facility 20. It should be understood that the disclosed methods can be used with any number of different systems and are not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with remote facility 20, mobile device 96, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 20) and data communication (e.g., to provide GPS location data or vehicle diagnostic data to the remote facility 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can be set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of one of the methods discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote facility 20 or other remote computer system, such as computer 18, for other purposes, such as fleet management. Also, new or updated map data can be downloaded to the GPS module 40 from the remote facility 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the remote facility 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 20, or both. A computer 18 can also be used for providing Internet connectivity such as DNS services or as a network address server that uses DHCP or other suitable protocol to assign an IP address to the vehicle 12.

Remote facility 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various remote facility components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote facility 20 using live advisor 86, it will be appreciated that the remote facility can instead utilize VRS 88 as an automated advisor or, a combination of VRS 88 and the live advisor 86 can be used.

The mobile device 96 may include: hardware, software, and/or firmware enabling cellular telecommunications and SRWC as well as other mobile device applications. The hardware of the mobile device 96 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle—e.g., among other things, allowing the user to remotely lock/unlock vehicle doors, turn the vehicle ignition on or off, check the vehicle tire pressures, fuel level, oil life, etc. In some embodiments, mobile device 96 may be a cellular telephone, or cell-phone. In addition, the application may also allow the user to connect with the remote facility 20 or call center advisors at any time.

Method—

Turning now to FIG. 2, there is shown a method of providing one or more selectable vehicle tasks to one or more vehicles. The method may be implemented by a remote facility 20, a computer 18, or by both working in conjunction. Alternatively, the method may be implemented by any other system that can perform the method of providing one or more selectable vehicle tasks to one or more vehicles. A vehicle task comprises at least one vehicle action that is carried out upon satisfaction of a conditional statement. A conditional statement comprises one or more vehicle conditions. For example, the vehicle task "Audibly Warn When Fuel Is Low" may comprise playing the spoken text "Fuel Low" through a speaker (i.e. a vehicle action) when the vehicle fuel sensor indicates that the fuel amount is less than 1 gallon and the vehicle is in drive (i.e. a conditional statement comprising two vehicle conditions connected by a logical operator). A logical operator may connect a logical expression (i.e. a vehicle condition) to one or more logical expressions (e.g. OR, AND, XOR, etc.). Alternatively, a unary operator (a type of logical operator) may be used, wherein the unary operator operates only on one logical expression (e.g. the NOT operator). A user-defined task is a vehicle task that was defined by a vehicle user. In some embodiments, the vehicle user may be the vehicle driver or a vehicle passenger. In other embodiments, the vehicle user may be an operator of a computer that may be communicatively linked to the vehicle.

The method begins with step 210, wherein user-defined tasks are received from each of a plurality of vehicle users. In one embodiment, one or more of the user-defined tasks may be defined by one or more vehicle users at one or more vehicles 12 (only one shown) via a user interface, which may be implemented, for example, using visual display 38, microphone 32, etc. Additionally, one or more of the user-defined tasks may be defined at a computer 18, remote facility 20, or mobile device 96. After defining a user-defined task, the device may send the user-defined task to a remote facility 20, computer 18, or any other location.

In one embodiment, the remote facility 20 may receive the user-defined tasks via communications system 10. For example, telematics unit 30 of vehicle 12 may send one or more user-defined tasks to remote facility 20 via wireless carrier system 14 and land network 16. A second vehicle 12 may send one or more user-defined tasks from the second vehicle's telematics unit 30 to remote facility 20 via communication satellites 62 and uplink transmitting station 64. In another embodiment, computer 18 may receive the user-defined tasks via land network 16 and/or any of the other illustrated communications means.

After the user-defined tasks are received, then step 220 may be carried out. In step 220, the user-defined tasks are grouped into equivalency classes. The grouping may be carried out by computer 18, server 82, or any other system that is capable of performing the grouping. The user-defined tasks may be grouped in any way that results in the equivalency classes containing user-defined tasks that have logically equivalent conditional statements and functionally equivalent vehicle actions.

FIG. 3 provides one embodiment of grouping the user-defined tasks into equivalency classes. The 3-step embodiment provides for grouping user-defined tasks into equivalency classes. Because one or more users, as opposed to devices (e.g. computers), will be defining the user-defined tasks, there may not be consistency with respect to the logical definitions of the conditional statements. For example, two users, a first user and a second user, may both attempt to define the same vehicle task on their respective vehicles. As an example, the vehicle task both users attempt to define may be the task of alerting the user of low fuel (i.e. a vehicle action as represented by "X" in FIG. 3 at step 210) if the fuel is below one gallon (i.e. a vehicle condition as represented by "C" in FIG. 3 at step 210) and either (a) the vehicle is on (i.e. a vehicle condition as represented by "A" in FIG. 3 at step 210) or (b) the keys are in the ignition (i.e. a vehicle condition as represented by "B" in FIG. 3 at step 210). The first user could define the vehicle task as:

IF: (vehicle is on OR keys are in the ignition) AND fuel level is low

THEN: alert the user of low fuel

The second user could define the vehicle task as:

IF: (vehicle is on AND fuel level is low) OR (keys are in the ignition AND fuel level is low)

THEN: alert the user of low fuel

The two user-defined tasks have logically equivalent conditional statements and equivalent vehicle actions; therefore, the two user-defined tasks may be grouped into the same equivalency class.

In step 220, the vehicle tasks are standardized so that all functionally equivalent vehicle tasks can be considered equivalent when analyzing the user-defined tasks. In one embodiment, such as is illustrated in step 222, only the conditional statements may need to be standardized. This may be because a user-defined task may be limited, in some instances, to only allowing a single vehicle action. However, in other embodiments, there may be a plurality of vehicle actions as part of a user-defined task and, therefore, standardization of the vehicle actions may be necessary to ensure that all functionally equivalent user-defined tasks are grouped in the same equivalency class.

The standardization process may take many forms and is not limited to the forms disclosed herein. A first step of standardization may be to convert the user-defined task into a normal form. Two common normal forms are the conjunctive normal form and the disjunctive normal form. The conjunctive normal form is a conjunction of clauses, wherein a clause is a disjunction of literals (i.e. vehicle conditions) (see the article "Conjunctive normal form" on Wikipedia™). On the other hand, the disjunctive normal form is a disjunction of clauses, wherein a clause is a conjunction of literals (see the article "Disjunctive normal form" on Wikipedia™). For example, the user-defined task 210a is in the conjunctive normal form, while the user-defined task 210b is in the disjunctive normal form. Although an algorithm may be employed on a computer 18 or at a remote facility 20 to standardize the user-defined tasks in this fashion, other rules may be imposed when standardizing. For example, calculating a standard form for a conditional statement may not ensure uniformity among logically equivalent conditional statements. As an example, 210a and 210c are in the same standard form (conjunctive normal form); however, the two have a different order of vehicle conditions. Other rules may be used in the standardization process to address this issue, such as alphabetizing vehicle conditions in a definite order, ordering the clauses of a conditional statement such that more complex clauses are placed first, etc.

Upon step 222 standardizing the user-defined tasks, step 224 may be carried out. In step 224, a hash mechanism is performed on the user-defined task in its standardized form. The hashing mechanism may be a hashing algorithm, function, or any other mechanism of hashing an input to an output. The hashing mechanism may take an input relating to the user-defined task, such as the standardized form (as calculated in step 222), the original form of the user-defined task, etc. The result of the hash mechanism may be an equivalency class or information that may be used in obtaining or identifying an equivalency class. It should be appreciated that a hashing mechanism may be used with or without standardization. The user-defined tasks may be stored in their original form (i.e. non-standardized form) along with some kind of indication of their corresponding equivalency class. Alternatively, data may be stored that was modified in accordance with receiving the user-defined task as opposed to storing the user-defined task in its original form. For example, a total count of user-defined tasks that fall within each equivalency class might be recorded. Other embodiments may store a count for each different user-defined task received, so that each equivalency class may maintain the most commonly user-defined form of the vehicle task.

Turning back now to FIG. 2, the method continues to step 230, wherein the equivalency classes are analyzed. Computer 18, server 82, remote facility 20, or any other computer or device may carry out the analysis. The equivalency classes may be analyzed based on a number of factors. In one embodiment, the analysis may rank the equivalency classes based on certain statistics. For example, the analysis may determine which equivalency classes are the most popular by analyzing the total number of user-defined tasks received that fall into each equivalency class. Also, the analysis might consider metadata associated with the equivalency classes. For example, the analysis may be based on the date of the received user-defined tasks.

In another embodiment, the analysis may take into consideration one or more vehicle profiles when analyzing the equivalency classes. A vehicle profile may be generated by the computer, or other device, that is performing one or more of the steps of method 200, or any other computer or system that may communicate with the system performing the analysis. A vehicle profile may be generated for each vehicle and may be based on vehicle attributes (e.g. make, model, engine type, etc.) and/or based on data received from the vehicle (e.g. transactional data indicating vehicle operations, data indicating vehicle properties or conditions, etc.). Further, the vehicle profile may be based on user-defined tasks that were sent from the vehicle to the remote facility or computer. For example, the vehicle profile of vehicle 12 can be based off a determination that the vehicle 12 travels through school zones very often. The computer or facility can then use this information in analyzing the equivalency classes.

In step 240, at least one vehicle task is selected based on the analysis in step 230. Since an equivalency class may contain functionally equivalent vehicle tasks defined in various ways, a representative vehicle task may be stored for each equivalency class. The representative vehicle task may be the most popular user-defined task that falls into that equivalency class, a predetermined vehicle task, or a standardized version (see step 220) of the vehicle task. Upon the analysis of the equivalency classes, step 240 may select one or more vehicle tasks. As an example, the top five most common equivalency classes (i.e. the top five equivalency classes, wherein the equivalency classes are ranked based on the number of user-defined tasks received that fell into each equivalency class) may be selected. Alternatively, the top ten trending (i.e. the top ten equivalency classes, wherein the equivalency classes are ranked based on the number of user-defined tasks received in the past seven days that fell into each equivalency class). It should be understood that vehicle tasks can be selected based on any criteria relating to any user-defined task that was received at the remote facility.

After at least one vehicle task is selected, step 250 is carried out wherein the selected vehicle task(s) are sent to one or more vehicles. The selected vehicle tasks are sent to the one or more vehicles via communications system 10. For example, the data containing the vehicle tasks may be sent to vehicle 12 via land network 16 and wireless communication system 14. At the vehicle 12, the selected vehicle task(s) are presented to the user as suggested vehicle tasks. The tasks may be presented via a user interface, such as the visual display 38 or the audio system 36. The method 200 ends.

Turning now to FIG. 4, there is a method of presenting one or more vehicle tasks to a user at a vehicle. The method begins with step 410, wherein the vehicle obtains one or more user-defined tasks. The one or more user-defined tasks may be defined by a user at a vehicle 12, at a remote location (e.g. remote facility 20), a computer 18, or at any other device of facility that may be communicatively linked to vehicle 12. A user may define one or more tasks at the vehicle via a user interface. The user interface may be an infotainment console, a mobile device that is communicatively linked to the vehicle 12, microphone 32, or visual display 38. In one embodiment, a user may define a vehicle task by pressing buttons and/or dragging objects on a touchscreen 38.

Upon the user defining one or more tasks, step 420 may be carried out wherein the one or more user-defined tasks are sent to a remote computer. The remote computer may be computer 18, server 82 in remote facility 20, etc. The vehicle 12 may send the one or more user-defined tasks to the remote computer via any communication path in communications system 10. One such example includes sending the data from vehicle 12 to computer 18 via wireless carrier system 14 and land network 16. Upon the remote computer receiving the one or more user-defined tasks, the remote facility may perform analysis and/or other calculations in response to receiving the user-defined vehicle tasks. This analysis can be done as described in connection with FIGS. 2 and 3 to determine suggested vehicle tasks.

At step 430, the vehicle 12 receives one or more selected vehicle tasks from a remote facility. The selected vehicle tasks are based at least in part on one or more user-defined tasks that were received at the remote computer from different vehicles. The remote facility may perform an analysis on received user-defined tasks when determining which vehicle tasks to send to the vehicle 12. This analysis may also be based on a vehicle profile that is generated at the remote facility. The vehicle profile may be generated based on vehicle attributes (e.g. make, model, engine type, etc.) and/or based on data received from the vehicle (e.g. transactional data indicating vehicle operations, data indicating vehicle properties or conditions, etc.). Further, the vehicle profile may be based on user-defined tasks that were sent from the vehicle to a remote facility or computer. For example, the vehicle profile of vehicle 12 can be based off a determination that the vehicle 12 travels through school zones very often. A computer or facility can then use this information in determining vehicle tasks that match or relate to the vehicle profile. In this case, the remote facility or computer may suggest a vehicle task wherein the operator of the vehicle is audibly warned to watch their speed (i.e. a vehicle action) when the vehicle enters a school zone (i.e. a conditional statement). For more detail regarding a possible method for selecting one or more vehicle tasks, see method 200.

After the vehicle 12 receives one or more selected tasks from a remote facility, the vehicle may carry out step 440. In this step, the vehicle 12 presents the selected vehicle tasks to an occupant in the vehicle via a user interface at the vehicle. The vehicle 12 may automatically present the one or more selected tasks after it receives the one or more selected tasks. Alternatively, the vehicle 12 may wait to carry out step 440 until the vehicle 12 receives an indication that presentation of the one or more selected tasks has been requested. The vehicle 12 may present the selected task(s) via the visual display 38 or audio system 36. Subsequently, the user may choose one or more of the selected vehicle task(s) to be configured to the vehicle. The vehicle 12 may then be configured to implement the chosen vehicle task(s). The method 400 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing one or more selectable vehicle tasks to one or more vehicles, comprising the steps of:
   (a) receiving from each of a plurality of vehicle users at least one user-defined task to be carried out by the user's vehicle, wherein the user-defined task comprises at least one vehicle action and a conditional statement, wherein the conditional statement comprises one or more vehicle conditions;
   (b) grouping the received user-defined tasks into equivalency classes, wherein different user-defined tasks that have logically equivalent conditional statements and equivalent vehicle actions are grouped into the same equivalency class, wherein the grouping step includes standardizing the conditional statement of each received user-defined tasks;
   (c) analyzing the equivalency classes;
   (d) selecting a plurality of vehicle tasks based on the analysis in step (c), wherein at least two of the selected vehicle tasks are grouped into different equivalency classes; and
   (e) configuring one or more vehicles to carry out one or more user-selected vehicle tasks, wherein the configuring step includes sending the selected vehicle tasks to the one or more vehicles, wherein each of the one or more vehicles are configured in response to receiving the selected vehicle tasks, and wherein the configuring causes the vehicle to:
   present at least one of the selected vehicle tasks to a user using a user interface included in vehicle electronics of the vehicle;
   receive a user selection of one or more of the presented vehicle tasks; and
   carry out the one or more user-selected vehicle tasks, wherein the vehicle automatically carries out, for each of the one or more user-selected vehicle tasks, the at least one vehicle action upon satisfaction of the conditional statement using one or more vehicle system modules (VSMs) included in the vehicle.

2. The method of claim 1, wherein step (b) further comprises grouping the received user-defined tasks into equivalency classes using a hashing mechanism, wherein the hashing mechanism is performed on a standardized form of the user-defined tasks.

3. The method of claim 1, wherein at least some of the conditional statements comprise a plurality of different vehicle conditions connected by one or more logical operators.

4. The method of claim 1, wherein step (c) further comprises analyzing metadata associated with the equivalency classes.

5. The method of claim 1, wherein any of the one or more vehicle conditions are bound by a unary operator.

6. The method of claim 1, wherein step (c) further comprises analyzing the equivalency classes based on a vehicle profile.

7. The method of claim 6, wherein the vehicle profile is generated at a remote location and based on data pertaining to the vehicle.

8. A method of carrying out one or more selectable vehicle tasks at one or more vehicles, comprising the steps of:
   for at least a first one of the one or more vehicles, receiving a user-defined vehicle task via one or more vehicle-user interfaces included in vehicle electronics of the first vehicle;
   for at least the first one of the one or more vehicles, sending the user-defined vehicle task to a remote server that is configured to group the user-defined vehicle task with other user-defined vehicle tasks, wherein the user-defined vehicle task is grouped with the other user-defined vehicle tasks that have logically equivalent conditional statements and equivalent vehicle actions;

receiving a set of vehicle tasks from the remote server at each of the one or more vehicles, wherein the set of vehicle tasks includes vehicle tasks from at least two separate groups such that the set includes at least two vehicle tasks that do not have logically equivalent conditional statements and/or that do not have equivalent vehicle actions;

presenting the set of vehicle tasks to a user at each of the one or more vehicles;

receiving a user selection of one or more of the set of vehicle tasks at each of the one or more vehicles; and carrying out the one or more selected vehicle tasks at each of the one or more vehicles using one or more vehicle system modules (VSMs) included in each of the one or more vehicles.

9. The method of claim 8, wherein at least one of the set of vehicle tasks is the user-defined vehicle task or is part of a same group of the user-defined vehicle task.

\* \* \* \* \*